United States Patent
Doyle et al.

(10) Patent No.: US 7,299,229 B2
(45) Date of Patent: Nov. 20, 2007

(54) GRID QUORUM

(75) Inventors: Ronald P. Doyle, Raleigh, NC (US); David Louis Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 10/424,034

(22) Filed: Apr. 25, 2003

(65) Prior Publication Data
US 2004/0215614 A1 Oct. 28, 2004

(51) Int. Cl.
*G06F 17/30* (2006.01)

(52) U.S. Cl. .................. 707/8; 707/1; 707/2

(58) Field of Classification Search .......... 707/1–104.1
See application file for complete search history.

(56) References Cited

U.S. PATENT DOCUMENTS

| 5,251,318 | A * | 10/1993 | Nitta et al. ................ 711/152 |
| 5,991,739 | A * | 11/1999 | Cupps et al. ................ 705/26 |
| 6,144,983 | A * | 11/2000 | Klots et al. ................ 718/104 |
| 6,438,705 | B1 * | 8/2002 | Chao et al. ................ 714/4 |
| 6,560,592 | B1 * | 5/2003 | Reid et al. ................ 707/2 |
| 6,597,956 | B1 * | 7/2003 | Aziz et al. ................ 700/3 |
| 6,662,219 | B1 * | 12/2003 | Nishanov et al. ........... 709/220 |
| 6,785,901 | B1 * | 8/2004 | Horiwitz et al. ............. 725/25 |
| 6,865,549 | B1 * | 3/2005 | Connor ................ 705/51 |
| 2002/0052914 | A1 * | 5/2002 | Zalewski et al. ........... 709/203 |
| 2002/0080539 | A1 * | 6/2002 | McClure et al. ............. 361/59 |
| 2003/0126265 | A1 * | 7/2003 | Aziz et al. ................ 709/227 |

OTHER PUBLICATIONS

Tang et al., "MOM-G: Message-ORiented Middleware on Grid Environment Based on OGSA", ICCNMC' 03, IEEE, 4 pages.*
Ramin Yahyapour, "Design and evaluation of job scheduling stragegies for grid computing", computer engineering institue, Nov. 2002, pp. 1-154.*
Joseph et al. , "GASS: A data movement and access service for wide area computing systems", ACM 1999, pp. 78-88.*
Vincenzo Di Martino, "Sub optimal scheduling in a grid using genetic algorithms", 2003, IEEE, pp. 1-7.*
Norman et al., "Database acces and integration services on the Grid", Feb. 1, 2002., pp. 1-18.*

(Continued)

*Primary Examiner*—Don Wong
*Assistant Examiner*—Linh Black
(74) *Attorney, Agent, or Firm*—Jeanine Ray-Yarletts, Esq.; Steven M. Greenberg, Esq.; Carey Rodriguez Greenberg & Paul LLP

(57) ABSTRACT

The present invention is a grid quorum system, method and apparatus. In a cluster of resources in a computing grid, a resource locking method can include acquiring a temporally limited lock on a grid service in the computing grid. Upon expiration of the temporally limited lock, a renewal of the temporally limited lock can be requested. Subsequently, the temporally limited lock can be renewed if a renewal has been granted by the grid service in response to the request. Notably, the renewing step can include determining whether the cluster has been partitioned into a plurality of sub-clusters. If the cluster has been partitioned, a parent sub-cluster can be identified and the temporally limited lock can be renewed only if a quorum exists in the parent sub-cluster.

16 Claims, 3 Drawing Sheets

OTHER PUBLICATIONS

Burke, et al., *Resource Locking Over Networks, Sys Admin the journal for UNIX systems administrators*, pp. 1-8, (Apr. 4, 2003), <http://www.samag.com/print/html>.

*Resource Locking versus Resource Management, CycleFree Software*, pp. 1-3, (2003), <http://www.acisinc.com/locking.html>.

*Open VMS Cluster Systems, Compaq Open VMS Documentation*, pp. 1-8, (2003), <http://tigger.stcloudstate.edu/-tigger/openvms/72final/4477/4477pro_002.html>.

*Connection Manager*, pp. 1-8, (2003), <http://h30097.www3.hp.com/docs/base_doc/DOCUMENTATION/V51B_HTML/ARHGV...html>.

*Distributed Lock Manager*, pp. 1 of 1, (2003), <http://h30097.www3.hp.com/docs/base_doc/DOCUMENTATION/V51B_HTML/ARHGV...>.

Lang, et al., *A Torus Quorum Protocol for Distributed Murtual Exclusion*, <http://www.cs.ucf.edu/csdept/faculty/lang/pubs/pdcs98.html>.

* cited by examiner

GRID QUORUM

BACKGROUND OF THE INVENTION

1. Statement of the Technical Field

The present invention relates to the field of resource locking and more particularly to quorum algorithms for managing resource locking in a clustered environment.

2. Description of the Related Art

The concurrent operation of multiple processes or services can introduce the problem of resource contention. Concurrent processes and services typically enjoy access to shared resources. Occasionally, individual processes and services require the exclusive use of selected resources for a period of time. Various mechanisms when applied are known to allow resources to become "locked" and "unlocked" by "cooperating concurrent processes." In this regard, where a cycle exists in the acquisition of locks, a deadlock can occur.

A common method used to avoid "resource deadlock" includes the hierarchical ordering of shared resources. In consequence of this hierarchy, locks can be acquired in order of the hierarchy, while locks which have been acquired can be released in an opposite order. In any case, it will be recognized that resource locking is a method to grant access to shared resources. Moreover, locking a shared resource for the duration of a transaction will result in the suspension of access to the locked resource as applied to other processes or services.

Resource locking can be problematic in that the burden of managing access to shared resources can be placed squarely upon each concurrent process or service. To that end, where a service or process has not been pre-configured to lock a resource prior to its use, or if a lock is acquired in a non-hierarchical manner, then a potential deadlock condition may exist. Accordingly, it has been suggested that resource management can provide a conceptually better solution for solving the resource contention problem.

In the resource management model, rather than having a pool of resources visible to many concurrent processes, the resources can be gathered and managed by a single "resource manager." Concurrent processes can request the resources from the manager, and the manager can arbitrate all resource requests to ensure fair allocation of the resources. Consequently, the arbitration of resource requests can be centralized within a single object instance. Moreover, program correctness can be guaranteed more easily. Nevertheless, although resource management can appear to be elegant from a conceptual level, programming language constraints can make resource management appear more difficult and error prone than mere resource locking.

To improve performance in a distributed system, often it can be preferred to share a locked resource among multiple processes or services. Additionally, locked resource sharing can be helpful in the circumstance where one might want to access a locked resource in multiple instances. Sharing a locked resource can be particularly important given the alternative possibility of creating and releasing a lock for each transaction with the resource. Moreover, to repeatedly create and release locks for each transaction with a resource can give rise to undesirable locking delays.

Though the problem of resource locking can be challenging to overcome in the conventional setting, the problem of resource locking can become compounded in the clustered environment. In a clustered environment, clustered systems share various data and system resources such as access to disks and files. To achieve the coordination that is necessary to maintain resource integrity, the cluster must have clear criteria for membership and must disallow participation in the cluster by systems that fail to meet the established criteria. To that end, an instance of a connection manager often can be included with a cluster to create the cluster, add and remove members to and from the cluster, track which members in the cluster are active, maintain a consistent cluster membership list, provide timely notification of changes to the membership, and detect and handle possible cluster partitions.

Typically, the connection manager can ensure data integrity in the face of communication failures by using a voting mechanism. The voting mechanism, referred to as a quorum algorithm, can permit processing and I/O within a cluster only when a majority of "votes" are present in the cluster. When the majority of votes are present, the cluster is said to have a quorum. The quorum algorithm, itself, can calculate a quorum based upon any number of factors, including for example, expected votes, current votes, node votes and quorum disk votes.

When resource locking is employed within the clustered environment, typically one cluster obtains a lock on a desired resource. Subsequently, transactions within the cluster requiring use of the locked resource can be routed to the locked resource as managed in the cluster. Still, when employing resource locking in the clustered environment, one must plan for network faults. For instance, when a cluster becomes partitioned, nodes formerly within the cluster which are no longer able to "see" other nodes across multiple partitions. Where one node acted as the locking resource prior to the partitioning, nodes in other partitions will not be able to resolve whether the lock has expired, or whether the cluster has been partitioned. Typically, a quorum algorithm can be applied in this circumstance.

While quorum algorithms have been successfully applied in respect to storage devices, such quorum algorithms usually depend upon low-level primitives associated with the storage devices. Thus, quorum algorithms heretofore have not been successfully applied to higher levels of the computing hierarchy such as a computing grid. As defined in exemplary fashion by the Open Grid Services Architecture (OGSA), a computing grid can provide protocols both in discovery and also in binding of Web services across distributed systems in a manner which would otherwise not be possible through the exclusive use of registries, directories and discovery protocols.

More specifically, as described both in Ian Foster, Carl Kesselman, and Steven Tuecke, *The Anatomy of the Grid*, Intl J. Supercomputer Applications (2001), and also in Ian Foster, Carl Kesselman, Jeffrey M. Nick and Steven Tuecke, *The Physiology of the Grid*, Globus.org (Jun. 22, 2002), a computing grid can provide distributed computing infrastructure through which grid services instances can be created, named and discovered by requesting clients. Grid services extend mere Web services by providing enhanced resource sharing and scheduling support, support for long-lived state commonly required by sophisticated distributed applications, as well as support for inter-enterprise collaborations. Moreover, while Web services alone address discovery and invocation of persistent services, grid services support transient service instances which can be created and destroyed dynamically.

Notable benefits of using grid services can include a reduced cost of ownership of information technology due to the more efficient utilization of computing resources, and an improvement in the ease of integrating various computing components. Thus, the grid mechanism, and in particular, a grid mechanism which conforms to the OGSA, can implement a service-oriented architecture through which a basis for distributed system integration can be provided—even across organizational domains. Nevertheless, the low-level primitives ordinarily associated with storage devices are not similarly associated with the computing grid. Thus, to date quorum algorithms useful for managing resource locking have been unavailable for use in the grid context.

SUMMARY OF THE INVENTION

The present invention is a grid quorum system, method and apparatus. In a cluster of resources in a computing grid, a resource locking method can include acquiring a temporally limited lock on a grid service in the computing grid. Upon expiration of the temporally limited lock, a renewal of the temporally limited lock can be requested. Subsequently, the temporally limited lock can be renewed if a renewal has been granted by the grid service in response to the request. Notably, the renewing step can include determining whether the cluster has been partitioned into a plurality of sub-clusters. If the cluster has been partitioned, a parent sub-cluster can be identified and the temporally limited lock can be renewed only if a quorum exists in the parent sub-cluster.

The step of computing the quorum can include a determination whether a number of resources in the parent sub-cluster exceeds half of all resources in the cluster. Alternatively, the quorum can be computed by determining whether a number of resources in the parent sub-cluster comprises at least half of all resources in the cluster. Based upon this computation, the temporally limited lock can be released if a quorum does not exist in the parent sub-cluster. In this regard, the temporally limited lock can be explicitly released, or the temporally limited lock can be allowed to expire if a quorum does not exist in the parent sub-cluster.

In a preferred aspect of the invention, the acquiring step can include determining whether a resource within the cluster already holds a temporally limited lock to the grid service. If no resource can be determined to hold a temporally limited lock to the grid service, the acquiring step can include competing with other resources in the cluster to acquire the temporally limited lock to the grid service. In this regard, the step of competing can include voting to obtain the temporally limited lock. Alternatively, the step of competing can include racing to obtain the temporally limited lock.

It will be recognized by the skilled artisan that the present invention can overcome the deficiencies of the prior art in providing a quorum process for use in managing resource locking in a computing grid. To that end, a computing grid which has been configured in accordance with the inventive arrangements can include a cluster manager programmed to manage the creation and operation of a cluster of resources in the computing grid. The cluster manager further can determine whether resources satisfy the cluster criteria for membership in order to add new resources to the cluster. Finally, the cluster manager can manage the process of partitioning the cluster into sub-clusters, and resolving sub-clusters into the cluster.

The system further can include at least one cluster of resources managed by the cluster manager. Furthermore, a quorum processor can be coupled to the cluster of resources. Finally, a multiplicity of lockable grid services can be configured in the computing grid to grant temporally limited locks to requesting ones of the resources in the cluster. Each grid service further can be configured both to renew granted ones of the temporally limited locks. Conversely, each grid service can be further configured to revoke granted ones of the temporally limited locks.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a quorum system and process for use in a computing grid in which grid services can be locked for use by one or more resources in a resource cluster. In accordance with the present invention, a lock holder initially can be determined from among a set of resources in a resource cluster. The lock holder can acquire a lock to a specific grid service in the computing grid, yet the lock can be temporally limited by an expiration parameter. Upon expiration of the lock, the lock holder can attempt to renew the lock. Where the cluster has not been partitioned, the lock can be renewed. Where the cluster has been partitioned, however, the lock can be renewed only where a quorum exists within a sub-cluster which includes the lock holder.

Figure 1:
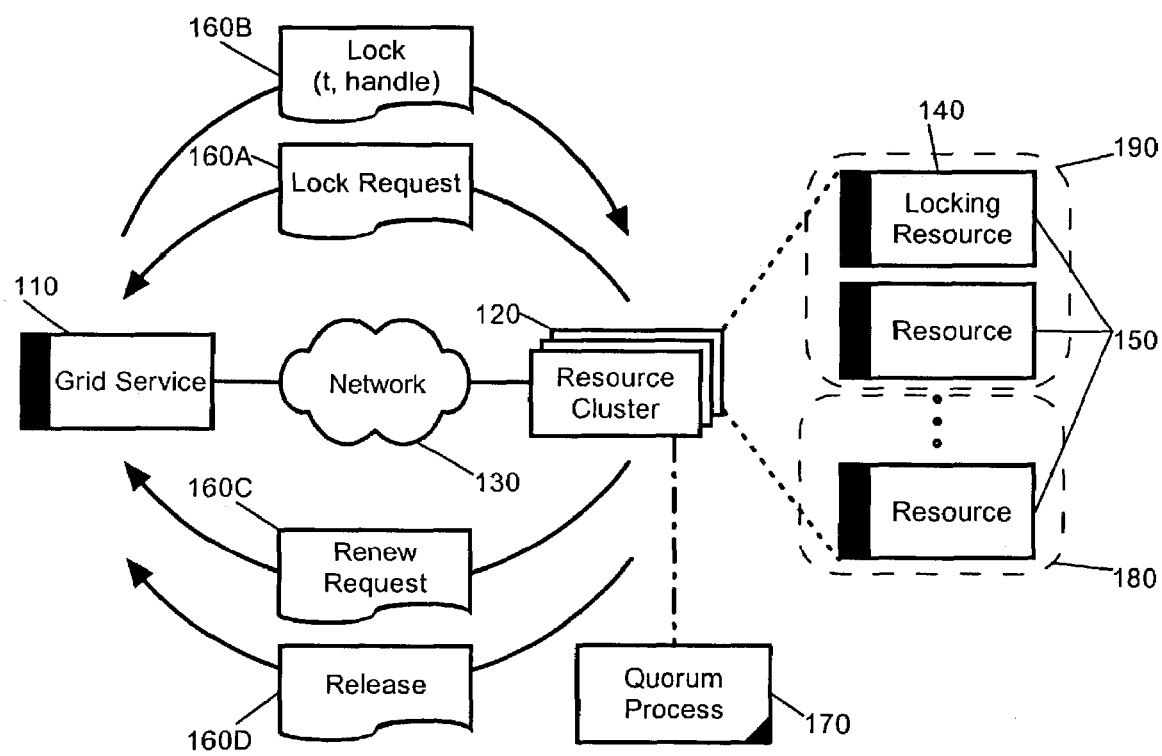
FIG. 1 is a schematic illustration of partial computing grid system configured to manage the locking of grid service resources according to the grid quorum process of the present invention.

FIG. 1 is a schematic illustration of partial computing grid with clustered resources which has been configured to manage the locking of grid service resources according to the grid quorum process of the present invention. The computing grid can include a multiplicity of grid services 100 coupled to one another of a computer communications network 130, for instance a private intranet, or the global Internet. Notably, it will be recognized by the skilled artisan that each grid service 110 can include a Web service wrapped with grid functionality. In this regard, in accordance with the present invention, the grid functionality can include logic for granting service locks and service lock renewals. More particularly, lock and renew port types to can be incorporated as part of or associated with the grid wrapper.

In any case, a cluster of resources 120 can be established, including, for instance other grid services in the computing grid. The cluster of resources 120 can include a set of resources 150 which have been added to the cluster based upon each individual resource 150 satisfying a set of criteria for membership in the cluster of resources 120. Notably, the cluster of resources 120 can be coupled to a quorum processor 170 configured to establish which of the resources 150 can establish a lock on the grid service 110. The quorum processor 170 further can manage lock renewal in the circumstance where the cluster of resources 120 becomes partitioned into two or more sub-clusters 180, 190.

Upon initialization, each of the resources 150 in the cluster of resources 120 can determine an initial lock holder or locking resource 140. For example, a voting process can be employed by the quorum process 170. In the voting process, a resource 150 can become the locking resource 140 for the cluster of resources 120 only when the number of votes attributed to the resource 150 exceeds the number of votes attributed to any one other resource 150 in the cluster of resources 120. In this regard, the term "votes" can refer to the fixed number of votes attributed to a resource in achieving quorum as is known in the art of clustered systems. Still, the skilled artisan will recognize that the manner in which an initial lock holder is determined is not limited to a voting process and other effective techniques can be applied, including for instance, a racing algorithm.

In any case, initially, a resource 150 aspiring to attain a lock on a grid service 110 can forward a lock request 160A to the grid service 110. The grid service 110 can grant a lock 160B to the requesting resource 150 if a lock is available and is not presently held by another resource 150. Notably, the lock 160B can include both a handle and an expiration parameter. The expiration parameter can indicate a duration of time during which the lock remains valid. Alternatively, the expiration parameter can indicate when a lock will expire. Of course, it will be understood that the expiration parameter can take many forms from which an expiration time can be computed and that the expiration parameter is not so limited to merely a fixed time or duration.

The lock 106B held by the locking resource 140 ultimately can expire according to the expiration parameter. Upon expiration or shortly therebefore, the locking resource 140 can issue a renew request 160C to the grid service 110 exclusively held by the locking resource 140. The grid service 110 upon receiving the renew request 160C can either issue a new lock 160B with a new expiration time, or the grid service 110 can reject the request resulting in the immediate revocation of the existing lock 160B. Importantly, however, even where a new lock 160B has been issued responsive to a renew request 160C, the new lock 160B only can be maintained without further analysis by the locking resource 140 where no partitioning of the cluster of resources 120 has occurred.

In the case where a partitioning of resources has occurred in the cluster of resources 120, two or more sub-clusters 180, 190 can result (only two sub-clusters shown for the purpose of simplicity of illustration). Notably, it will apparent to the skilled artisan that upon producing sub-clusters 180, 190 within the cluster of resources 120, individual ones of the sub-clusters 180, 190 can enjoy a quorum of votes, or lack a quorum of votes as the case may be. In the quorum process 170 of the present invention, a resource 150 within a sub-clusters 180, 190 which lacks quorum cannot hold a lock 160B on a grid service 110.

More particularly, when a locking resource 140 successfully receives a new lock 160B responsive to a renew request 160C, the locking resource 140 can determine whether a partitioning of the cluster of resources 120 has occurred. If a partitioning has transpired, the quorum process 170 can be executed within each resource 150 in the cluster of resources 120. Specifically, each resource 150 can determine whether their respective sub-cluster 180, 190 contains a quorum. As an example, the quorum can include a minimum number of votes. Alternatively, and in the preferred case, however, the quorum can include a total number of resources 150 in the sub-cluster 180, 190, such as the case where the total number of resources 150 in the sub-cluster 180, 190 exceeds one-half of all resources 150 in the cluster of resources 120.

Where a quorum can be identified in the sub-cluster 190 holding the locking resource 140, the locking resource 140 can maintain the lock 160B and can so notify the other resources 150 in the cluster of resources 120. By compari-son, where the locking resource 140 is included as part of a sub-cluster 190 lacking a quorum, the locking resource 140 can relinquish the lock 160B through the issuance of a relinquish request 160D to the grid service 110. Alternatively, the locking resource 140 simply can permit the lock 160B to expire. Importantly, where a resource 150 undertaking the quorum process 170 determines that the resource 150 is included as part of a sub-cluster with quorum which lacks a lock holder, the initial process for determining a lock holder for the grid service 110 can be undertaken.

One of ordinary skill in the art will recognize inherent advantages to the quorum process 170 of the present invention. First, even where the cluster of resources 120 has been partitioned, once the partitions have been resolved so that all resources 150 can rejoin the single cluster of resources 120, no further logic will be required to resolve the identity of the locking resource 140. Thus, partition resolution does not disrupt lock ownership. Additionally, as the lock 160B issued by the grid service 110 is not perpetual, but time limited, the partitioning of the cluster of resources 120 into two sub-clusters 180, 190 of equal size will not result in an unrecoverable failure as would have been the case conventionally. Rather, the sub-cluster lacking the locking resource simply can re-attempt lock requests until the locking resource relinquishes the lock.

Figure 2:
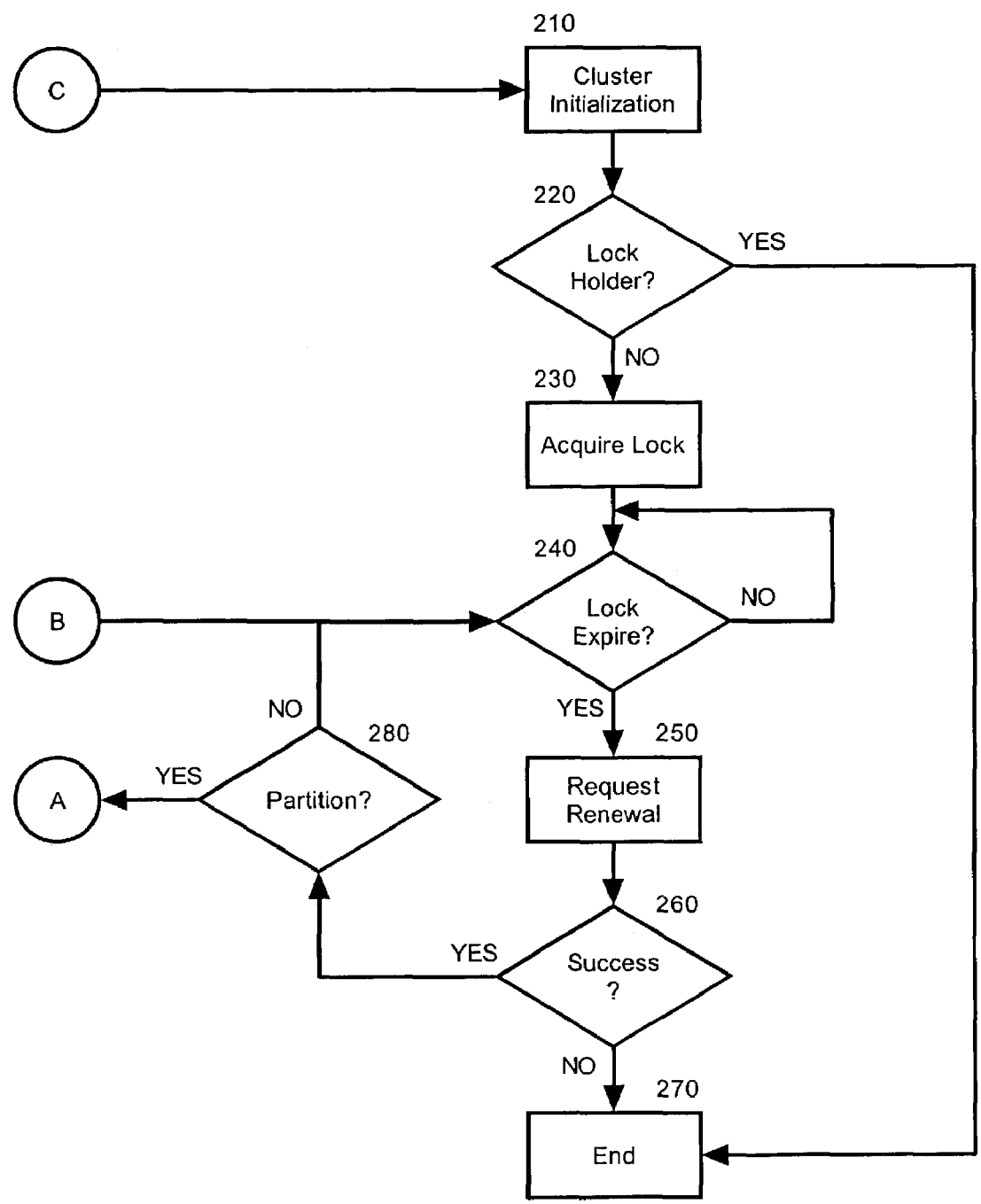
FIG. 2 is a flow chart illustrating a process for acquiring and renewing a lock in the computing grid of FIG. 1; and, FIG. 3 is a flow chart illustrating a process for acquiring a lock in a sub-cluster within a clustered environment in the computing grid of FIG. 1.

FIG. 2 is a flow chart illustrating a process for acquiring and renewing a lock in the computing grid of FIG. 1. In particular, the process of FIG. 2 can be undertaken in each resource in a resource cluster. Beginning in block 210, the cluster can initialize in which an initial lock holder can be determined. As an example, a voting process or a racing process can be undertaken to resolve the initial lock holder. That is, each resource in the cluster can set forth a best effort to obtain the lock, either passively by way of a vote, actively by racing, or otherwise. Where the resource determines that it is not the lock holder in decision block 220, the process can end in block 270 for the resource. Otherwise, the process can continue through blocks 230 through 280.

In block 230, the resource, now referred to as the locking resource, can acquire a lock to the desired grid service. The lock issued by the grid service, however, can include an expiration parameter limiting the duration in which the locking resource can hold the lock. In decision block 240, the locking resource can determine whether the lock has expired. Upon the determination that the lock has expired, in block 250 the locking resource can request that the grid service renew the lock. In decision block 260, where the grid service has denied the renewal request, the lock can be thereafter revoked and the process can end in block 270. Otherwise, it can be further determined whether the cluster has been partitioned during the term of the lock. If not, the process can repeat through block 240. Otherwise, a quorum process can be undertaken through jump circle A leading to FIG. 3.

Figure 3:
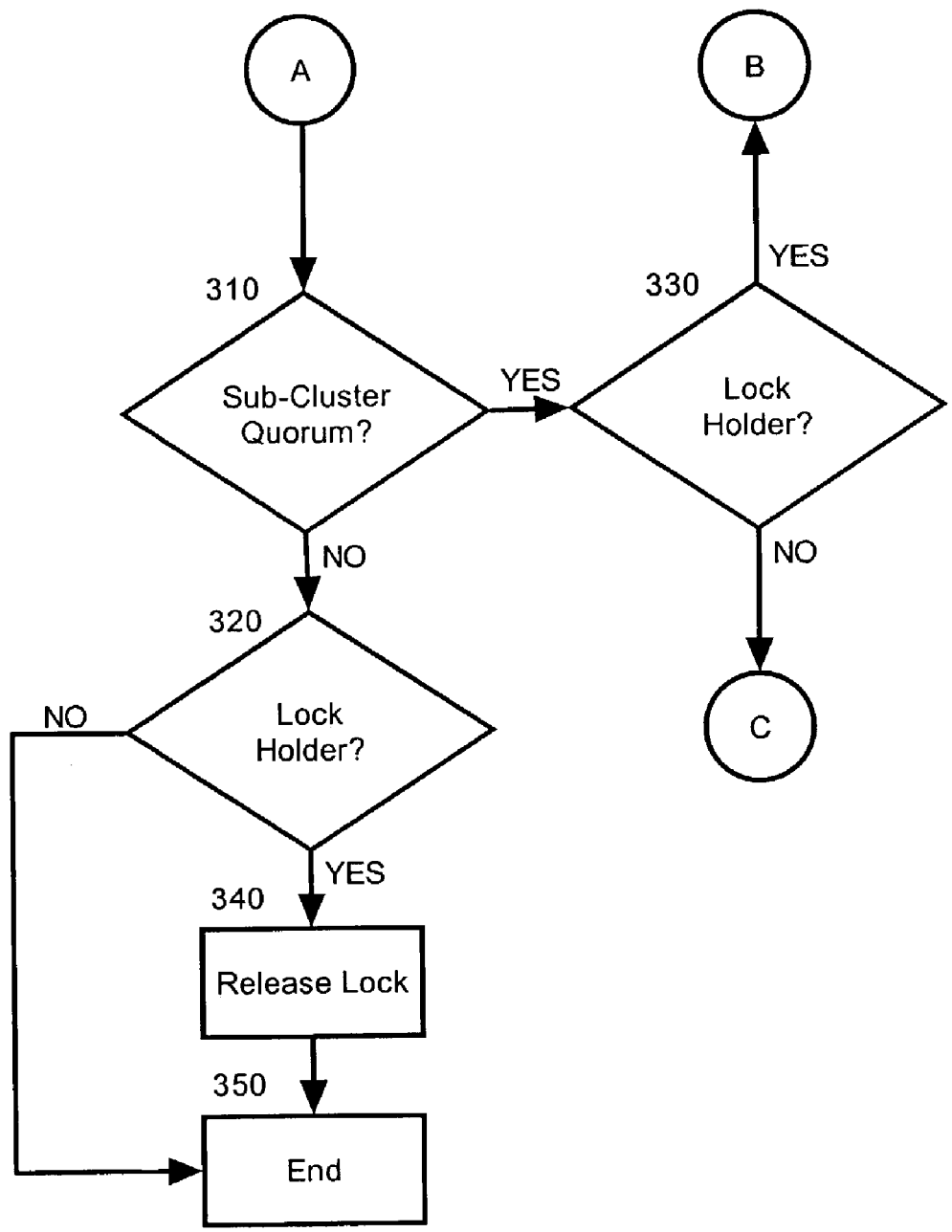

FIG. 3 is a flow chart illustrating a process for acquiring a lock in a sub-cluster within a clustered environment in the computing grid of FIG. 1. The process illustrated in FIG. 3 can be performed for all resources in the sub-cluster. Proceeding from jump circle A to decision block 310, it can be determined whether the sub-cluster in which the resource resides enjoys quorum. In a preferred aspect of the invention, a quorum can be defined as a number of resources in the sub-cluster which exceeds the number of half of the resources in the cluster by at least one cluster (N/2+1).

If so, it can further be determined in block 330 whether the resource is the locking resource. If so, the process can return to decision block 240 of FIG. 2 through jump circle B. Otherwise, where the resource resides in a sub-cluster having quorum, leading through the jump circle C to block 210 of FIG. 2, the resource can attempt to gain a lock on the grid service through the cluster initialization process. Notably, in decision block 310, where a quorum does not exist for the sub-cluster, in decision block 320 it can be determined whether the resource is the locking resource. If so, the locking resource can release the lock in block 340 and the process can end in block 350.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. In a cluster of resources in a computing grid, a resource locking method comprising:
   acquiring a temporally limited lock on a grid service in the computing grid;
   upon expiration of said temporally limited lock, requesting a renewal of said temporally limited lock; and,
   renewing said temporally limited lock if a renewal has been granted by said grid service in response to said request, wherein said acquiring step comprises the steps of:
   determining whether a resource within the cluster already holds a temporally limited lock to said grid service; and,
   if no resource can be determined to hold a temporally limited lock to said grid service, competing with other resources in the cluster to acquire said temporally limited lock to said grid service.

2. The method of claim 1, wherein said renewing step comprises the steps of:
   determining whether the cluster has been partitioned into a plurality of sub-clusters; and,
   if the cluster has been partitioned, identifying a parent sub-cluster and renewing said temporally limited lock only if a quorum exists in said parent sub-cluster.

3. The method of claim 2, further comprising the step of computing said quorum by determining whether a number of resources in said parent sub-cluster exceeds more than half of all resources in the cluster.

4. The method of claim 2, further comprising the step of computing said quorum by determining whether a number of resources in said parent sub-cluster comprises at least half of all resources in the cluster.

5. The method of claim 2, further comprising the step of releasing said temporally limited lock if a quorum does not exist in said parent sub-cluster.

6. The method of claim 2, further comprising the step of allowing said temporally limited lock to expire if a quorum does not exist in said parent sub-cluster.

7. The method of claim 1, wherein said step of competing comprises voting to obtain said temporally limited lock.

8. The method of claim 1, wherein said step of competing comprises racing to obtain said temporally limited lock.

9. A machine readable storage having stored thereon a computer program for resource locking in a cluster of resources in a computing grid, said computer program comprising a routine set of instructions for causing the machine to perform the steps of:
   acquiring a temporally limited lock on a grid service in the computing grid;
   upon expiration of said temporally limited lock, requesting a renewal of said temporally limited lock; and,
   renewing said temporally limited lock if a renewal has been granted by said grid service in response to said request, wherein said acquiring step comprises the steps of:
   determining whether a resource within the cluster already holds a temporally limited lock to said grid service; and,
   if no resource can be determined to hold a temporally limited lock to said grid service, competing with other resources in the cluster to acquire said temporally limited lock to said grid service.

10. The machine readable storage of claim 9, wherein said renewing step comprises the steps of:
    determining whether the cluster has been partitioned into a plurality of sub-clusters; and,
    if the cluster has been partitioned, identifying a parent sub-cluster and renewing said temporally limited lock only if a quorum exists in said parent sub-cluster.

11. The machine readable storage of claim 10, further comprising the step of computing said quorum by determining whether a number of resources in said parent sub-cluster exceeds more than half of all resources in the cluster.

12. The machine readable storage of claim 10, further comprising the step of computing said quorum by determining whether a number of resources in said parent sub-cluster comprises at least half of all resources in the cluster.

13. The machine readable storage of claim 10, further comprising the step of releasing said temporally limited lock if a quorum does not exist in said parent sub-cluster.

14. The machine readable storage of claim 10, further comprising the step of allowing said temporally limited lock to expire if a quorum does not exist in said parent sub-cluster.

15. The machine readable storage of claim 9, wherein said step of competing comprises voting to obtain said temporally limited lock.

16. The machine readable storage of claim 9, wherein said step of competing comprises racing to obtain said temporally limited lock.

* * * * *